US012720393B2

(12) United States Patent
Spapis et al.

(10) Patent No.: US 12,720,393 B2
(45) Date of Patent: Aug. 25, 2026

(54) RADIO ACCESS NETWORK DATA TRANSFER FOR USER EQUIPMENT MOBILITY

(71) Applicant: Nokia Solutions and Networks Oy, Espoo (FI)

(72) Inventors: Panagiotis Spapis, Munich (DE); Subramanya Chandrashekar, Bangalore (IN); Halit Murat Gürsu, Munich (DE); Ömer Bulakci, Munich (DE); Alperen Gundogan, Munich (DE); Ahmad Awada, Munich (DE); Ingo Viering, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 316 days.

(21) Appl. No.: 18/564,311

(22) PCT Filed: Apr. 5, 2022

(86) PCT No.: PCT/EP2022/058932
§ 371 (c)(1),
(2) Date: Nov. 27, 2023

(87) PCT Pub. No.: WO2022/253485
PCT Pub. Date: Dec. 8, 2022

(65) Prior Publication Data

US 2024/0381209 A1 Nov. 14, 2024

(30) Foreign Application Priority Data

Jun. 3, 2021 (IN) ............................. 202141024727

(51) Int. Cl.
*H04W 36/08* (2009.01)
*H04W 36/00* (2009.01)
*H04W 36/30* (2009.01)

(52) U.S. Cl.
CPC ..... *H04W 36/087* (2023.05); *H04W 36/0072* (2013.01); *H04W 36/304* (2023.05)

(58) Field of Classification Search
CPC ........... H04W 36/087; H04W 36/0072; H04W 36/304
See application file for complete search history.

(56) References Cited

U.S. PATENT DOCUMENTS 10,531,336 B2 1/2020 Goldhamer
12,010,577 B2 * 6/2024 Byun ................. H04W 68/005
(Continued)

FOREIGN PATENT DOCUMENTS

EP 3621350 A1 3/2020
WO 2017/065657 A1 4/2017

OTHER PUBLICATIONS

"3rd Generation Partnership Project; Technical Specification Group Radio Access Network; NG-RAN; Architecture description (Release 16)", 3GPP TS 38.401, V16.4.0, Jan. 2021, pp. 1-78.
(Continued)

*Primary Examiner* — Kibrom T Hailu
(74) *Attorney, Agent, or Firm* — Lippes Mathias LLP

(57) ABSTRACT

According to an example aspect of the present invention, there is provided a method comprising: detecting a need to perform a handover for a user equipment from a cell of a second node of the radio access network to a cell of a third node of the radio access network, transmitting, to the second node and in response to detecting the need to perform the handover, a control message comprising an indication for downlink data forwarding at a radio link control level to the third node.

20 Claims, 5 Drawing Sheets

(56) References Cited

U.S. PATENT DOCUMENTS

| | | | | |
|---|---|---|---|---|
| 2017/0359848 | A1 | 12/2017 | Tenny et al. | |
| 2018/0332516 | A1 | 11/2018 | Oak et al. | |
| 2021/0227435 | A1* | 7/2021 | Hsieh | H04W 36/087 |
| 2022/0104087 | A1* | 3/2022 | Futaki | H04W 36/362 |
| 2022/0279391 | A1* | 9/2022 | Bae | H04W 36/0033 |
| 2023/0083266 | A1* | 3/2023 | Wu | H04W 76/34 370/331 |

OTHER PUBLICATIONS

"3rd Generation Partnership Project; Technical Specification Group Radio Access Network; NR; Radio Link Control (RLC) protocol specification (Release 16)", 3GPP TS 38.322, V16.2.0, Dec. 2020, pp. 1-33.

"Msc-generator", Sourceforge, Retrieved on Dec. 11, 2023, Webpage available at : https://sourceforge.net/projects/msc-generator/.

International Search Report and Written Opinion received for corresponding Patent Cooperation Treaty Application No. PCT/EP2022/058932, dated Jul. 22, 2022, 14 pages.

"3rd Generation Partnership Project; Technical Specification Group Radio Access Network; Study on New Radio Access Technology; Radio Access Architecture and Interfaces (Release 14)", 3GPP TR 38.801, V2.0.0, Mar. 2017, pp. 1-90.

* cited by examiner

RADIO ACCESS NETWORK DATA TRANSFER FOR USER EQUIPMENT MOBILITY

RELATED APPLICATION

This application claims priority to PCT Application No. PCT/EP2022/058932, filed on Apr. 5, 2022, which claims priority to IN application Ser. No. 202141024727, filed on Jun. 3, 2021, each of which is incorporated herein by reference in its entirety.

FIELD

Various example embodiments relate to controlling data transfer at radio access network to support mobility of a user equipment and handover from one cell to another.

BACKGROUND

Efficient mobility handling is an important element for current and future mobile communications generation use cases with a growing number, as well as new types of wireless devices, and increasing quality of service requirements for data throughput and transmission delays.

Radio access network (RAN) architecture may apply a split architecture, in which a logical RAN node may be split to a central and distributed unit(s) for further flexibility. A distributed unit (DU) may be responsible for real time layer 1 and 2 scheduling functions, and a centralized unit (CU) responsible for non-real time, higher layer 2 and 3 functions. Mobility of a user equipment between cells of distributed units should be supported with minimal delays and data retransmissions, particularly in view of high requirements of time-critical applications.

SUMMARY

According to some aspects, there is provided the subject matter of the independent claims. Some embodiments for some or all of the aspects are defined in the dependent claims.

According to a first aspect, there is provided a method for a first node of a radio access network, comprising: detecting a need to perform a handover for a user equipment from a cell of a second node of the radio access network to a cell of a third node of the radio access network, transmitting, to the second node and in response to detecting the need to perform the handover, a control message comprising an indication for downlink data forwarding at a radio link control level to the third node.

According to a second aspect, there is provided a method for a second node of a radio access network, comprising receiving, from a first node of the radio access network, a control message in response to a need to perform a handover for a user equipment from a cell of the second node to a cell of a third node of the radio access network, wherein the control message comprises an indication for downlink data forwarding at a radio link control level to the third node, and forwarding, in response to the received indication, downlink data received from the first node at the radio link control level to the third node.

According to a third aspect, there is provided a method for a third node of a radio access network, comprising: receiving, from a first node of the radio access network, a request for setting up a data bearer for a user equipment for performing a handover for the user equipment from a cell of a second node to a cell of the third node, receiving downlink data at a radio link control level from the second node after transmitting to the first node a response to the request, and transmitting the received downlink data to the user equipment.

According to a fourth aspect, there is provided an apparatus, comprising means configured for performing the method of the first aspect, the second aspect, the third aspect, or an embodiment thereof. The means may comprise one or more processors and memory comprising instructions, when executed by the one or more processors, cause the apparatus to perform the method.

According to further aspects, there is provided an apparatus, comprising one or more processors and memory comprising instructions, when executed by the one or more processors, cause the apparatus for performing the method of the first aspect, the second aspect, the third aspect, or an embodiment thereof.

The apparatus of any of the aspects may be a radio access network device or for/comprised by a radio access network device. The first node, or the apparatus configured to operate as the first node, may be a central or controller unit of a gNB configured to control the handover for the user equipment. The second node, or the apparatus configured to operate as the second node, may be a source distributed unit of a gNB. The third node, or the apparatus configured to operate as the third node, may be a target distributed unit of a gNB.

According to still further aspects, there is provided a computer program product, a computer readable medium, or a non-transitory computer readable medium comprising program instructions for causing, when executed in a processor of an apparatus, the apparatus to perform the method according to any one of the above aspects or embodiments thereof.

DETAILED DESCRIPTION

Figure 1:
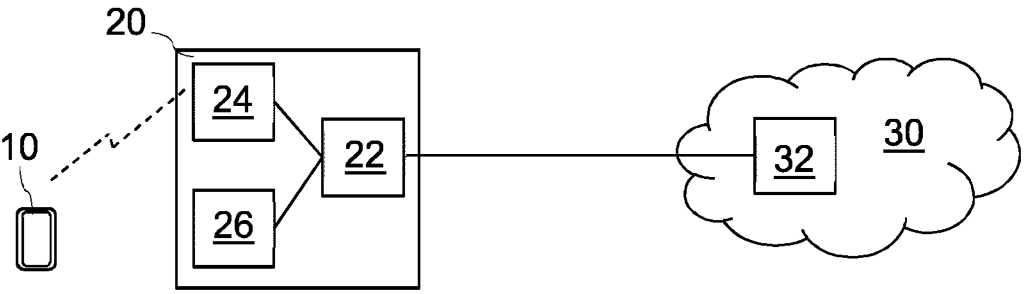
FIG. 1 illustrates an example of a wireless communications system.

FIG. 1 illustrates a simplified example wireless communications system. A user equipment (UE) 10 communicates wirelessly with a wireless radio or access network portion or node, hereafter referred to as AN, 20, such as a NodeB, an evolved NodeB (eNB), a Next Generation (NG) NodeB (gNB), a base station, an access point, or other suitable wireless/radio access network (RAN) device or system.

The UE 10 may attach or register to the AN 20 for wireless communications. The air interface between UE and AN may be configured in accordance with a Radio Access Technology, RAT, which both the UE 10 and AN 20 are configured to support.

Examples of cellular RATs include Long Term Evolution, LTE, New Radio, NR, which is also known as fifth generation, 5G, and MulteFire. On the other hand, examples of non-cellular RATs include Wireless Local Area Network, WLAN, and Worldwide Interoperability for Microwave Access, WiMAX. Principles of the present disclosure are not limited to a specific RAT though. For example, in the context of NR, AN 20 may be a gNB, but in the context of another RAT, AN 20 may be another type of base station, access node or nodeB.

The AN 20 may comprise one or more operationally and/or physically separate sub-units or nodes 22, 24, 26 referred to below as nodes or logical RAN nodes. One of the nodes, in the present example (first) node 22, may be a node connected to further network(s), such as core network 30, and may control one or more other nodes 24. The controlling node 22 may be a central unit (CU) and the controlled node(s) 24, 26 may be distributed unit(s) (DU), such as the gNB-CU and gNB-DU connected over F1 interface of 3GPP 5G RAN, respectively. There are a plurality of options on how gNB functions may be split between the gNB-CU and gNB-DU. Without limitation to the 3GPP system, node 22 is referred to as CU (or gNB CU) 22 and node 24/26 as DU (or gNB DU) 24/26 in some of the below examples.

The AN 20 may be connected, directly or via at least one intermediate node, with one or more devices or elements 32 of a core network 30, such as a Next Generation core network, Evolved Packet Core (EPC), or other network management element. The core network 30 may comprise a set of network functions. A network function may refer to an operational and/or physical entity. For example, the element 32 may be a network function or be configured to perform one or more network functions. The network function may be a specific network node or element, or a specific function or set of functions carried out by one or more entities, such as virtual network elements. Examples of such network functions include an access control or management function, mobility management or control function, session management or control function, interworking, data management or storage function, authentication function or a combination of one or more of these functions.

For example, a 3GPP 5G core network comprises Access and Mobility Management Function (AMF) which may be configured to terminate RAN control plane (N2) interface and perform registration management, connection management, reachability management, mobility management, access authentication, access authorization, Security Anchor Functionality (SEAF), Security Context Management (SCM), and support for interface for non-3GPP access. The AMF is in charge i.a. for managing handovers between gNBs and initiating core-network paging by a paging message to a gNB.

The core network 30 may be, in turn, coupled with another network (not shown), via which connectivity to further networks may be obtained, for example via a worldwide interconnection network. The AN 20 may be connected with at least one other AN as well via an inter-base station interface, particularly for supporting mobility of the UE 10, e.g. by 3GPP X2 or similar NG interface.

The UE 10 may be referred to as a user device or wireless terminal in general. Hence, without limiting to Third Generation Partnership Project (3GPP) User Equipment, the term user equipment is to be understood broadly to cover various mobile/wireless terminal devices, mobile stations and user devices for user communication and/or machine to machine type communication. The UE 10 may be or be comprised by, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable user device or mobile station, i.e., a terminal.

Additionally, although the apparatuses have been depicted as single entities, different units, processors and/or memory units (not all shown in FIG. 1) may be implemented inside these apparatuses, to enable the functioning thereof. The system may also be able to support the usage of cloud services, for example at least part of core network operations may be carried out as a cloud service. The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. For example, in a 5G cloud RAN, the DU's server and relevant software could be hosted on a site itself or can be hosted in an edge cloud (datacenter or central office) depending on transport availability and fronthaul interface. The CU's server and relevant software can be co-located with the DU or hosted in a regional cloud data center. One of the concepts for 5G networks is network slicing in which multiple independent and dedicated virtual sub-networks (network instances) may be created within the same infrastructure to run services that have different requirements on latency, reliability, throughput and mobility.

The depicted system is only an example of a part of a system and in practice, the system may comprise further access nodes, e.g. with the split CU-DU architecture, the user device may have an access to a plurality of radio cells and the system may comprise also other apparatuses, such as physical layer relay nodes or other core network functions or elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure. 5G may also utilize satellite communication to enhance or complement the coverage of 5G service, for example by providing backhauling.

Figure 2:
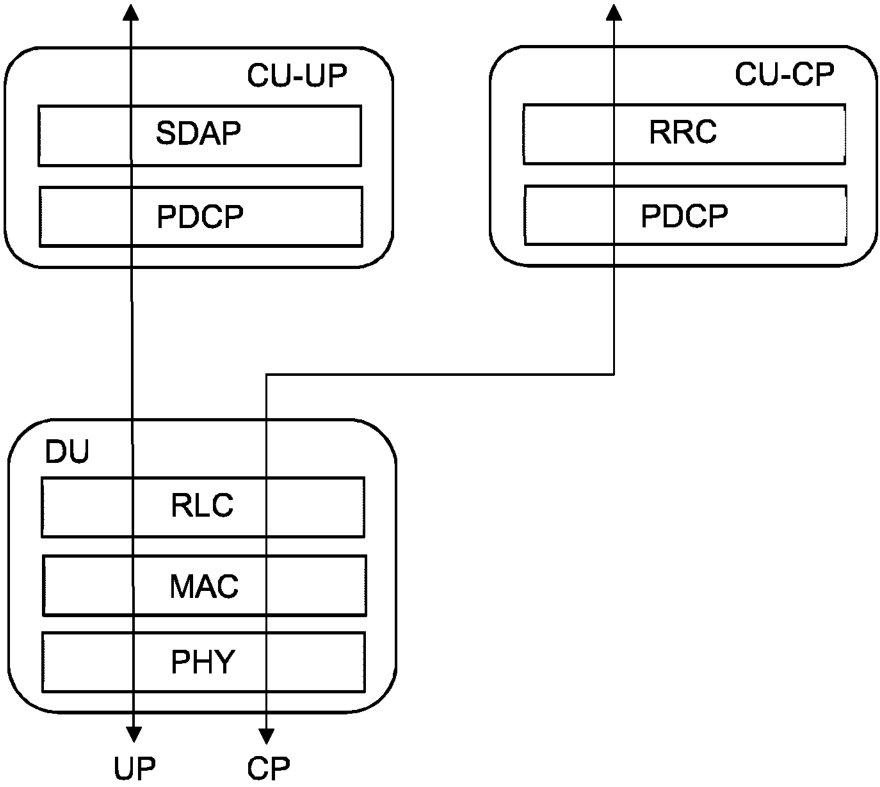
FIG. 2 illustrates CU-DU split and protocol architecture.

FIG. 2 further illustrates 5G CU-DU split and protocol architecture. CU provides support for higher layers of the protocol stack (i.e., non-real time operations) and there is a single CU for each gNodeB. DU provides support for the lower layers of the protocol stack, i.e., real time L1 and L2 scheduling functions. Multiple DUs may be connected to each CU. As an example there can be more than 100 distributed units connected to a specific centralized unit. The DUs are connected to the CU via F1-C and F1-U interfaces for control plane (CP) and user plane (UP), respectively. CU-UP comprises service adaptation protocol (SDAP) and packet data convergence protocol (PDCP) functions and CU-CP comprises radio resource control (RRC) and PDCP functions.

A radio link control (RLC) entity in the DU can be configured to perform data transfer in one of the following three modes:

In Transparent Mode (TM) the RLC entity does not perform any special modification in the received packets but it performs buffering.

In Unacknowledged Mode (UM) the RLC entity performs, in addition to buffering, segmentation to the received data before the transmission and it adds RLC header.

In Acknowledged Mode (AM) the RLC entity performs the same functionalities as in UM, but further requires ACK/NACK from the other end of the communication. If the ACK is not received within specific time limits the RLC packet (Packet Data Unit) is being retransmitted.

TM and UM mode have a separate RLC entity for transmitting and receiving, whereas AM mode includes only a single RLC entity that performs both transmitting and reception functionalities.

In a case of an inter-DU intra-CU mobility, according to 3GPP architecture description specification 38.401, UE provides a measurement report to the source gNB-DU, e.g. DU 24 in the example of FIG. 1, which forwards the report to the gNB-CU, e.g. CU 22. The gNB-CU detects a need for handover and sets up a target gNB-DU, e.g. DU 26. The gNB-CU informs the UE through the Source gNB-DU. The source gNB-DU provides a downlink (DL) data delivery status to the gNB-CU. The UE performs RACH access to the target gNB-DU, which then provides a downlink data delivery status to the gNB-CU. Downlink packets, which may include PDCP PDUs not successfully transmitted in the source gNB-DU, are sent from the gNB-CU to the target gNB-DU. It is up to gNB-CU implementation whether to start sending downlink user data to target gNB-DU before or after reception of the downlink data delivery status.

During UE handover, the data will hence be forwarded by the CU to the target DU, given the current protocol architecture requiring all the interactions to happen through the CU. This is because forwarded data over the F1 interface are PDCP PDUs sent over general packet radio system tunnelling protocol (GTP) tunnels. In particular, in case of lost packets, the acknowledgment should take place at the PDCP level, thus requiring the involvement of the CU. Interactions through the F1-C/F1-U interface add further delays and signaling cost. This involves the PDCP layer which introduces processing delays that may be unacceptable for time critical applications. Moreover, in case of a conditional handover (CHO), where there is a much more prominent phase of data forwarding involving one or more target cells, all the RLC processing functions like segmentation, (re)-transmission etc. performed at source cell/DU are simply discarded because, currently, the transmission at the target cell begins from the last unacknowledged PDCP SN and ignores the RLC PDUs status at the source cell/DU.

Figure 3:
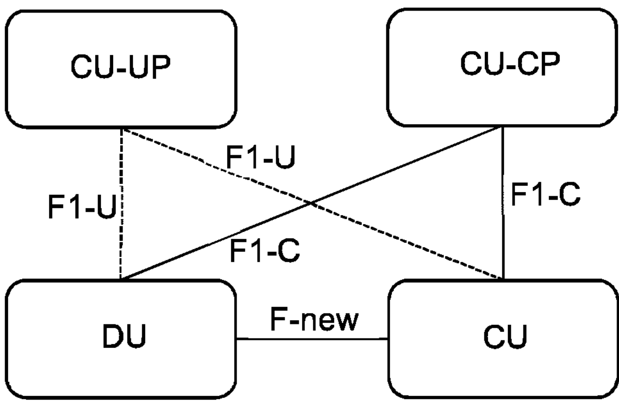
FIG. 3 illustrates RAN architecture in accordance with at least some example embodiments.

There are now provided improvements for downlink data transmission during inter-DU handovers, based on RLC level data forwarding. FIG. 3 illustrates an embodiment for enhanced 3GPP CU-DU architecture, in which a new interface, referred herein as F-new, is provided between DUs. F-new is a user plane interface and used (at least for) for data forwarding between source and target cells in case of inter-DU handover. A source DU may thus forward DL packets at RLC level to a target DU over the F-new interface.

Figure 4:
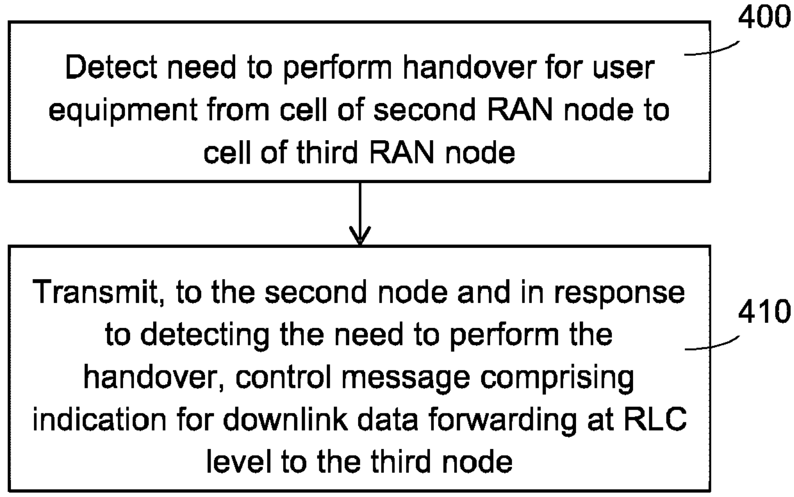
FIGS. 4 to 6 illustrate methods in accordance with at least some example embodiments.

FIG. 4 is a flow graph of a method for controlling RLC data transmission for handover of a UE in accordance with at least some embodiments. The method may be performed by a (first) RAN node, such as the CU 22 (which is also referred to some further example embodiments), or by a control device configured to control the functioning thereof. It is to be noted that an action, such as transmitting, in a given block of any of the methods disclosed herein may refer to controlling or causing such action in another apparatus or unit.

Block 400 comprises detecting a need to perform a handover for a user equipment from a cell of a second node of the RAN to a cell of a third node of the RAN.

Block 410 transmitting, to the second node in response to detecting the need to perform the handover, a control message comprising an indication for downlink data forwarding at RLC level to the third node.

Figure 5:
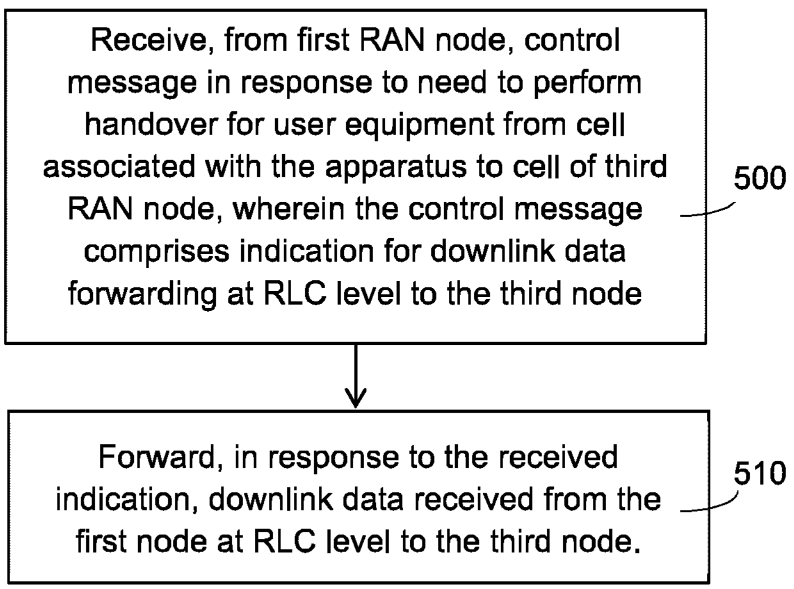

FIG. 5 is a flow graph of a method for controlling RLC data transmission for handover of a UE accordance with at least some embodiments. The method may be performed by a (second) RAN node, such as the DU 24 (which is also referred to some further example embodiments) operative as a source node for the handover, or by a control device configured to control the functioning thereof.

Block 500 comprises receiving, from a first node of the RAN, a control message in response to a need to perform a handover for a user equipment from a cell associated with the apparatus to a cell of a third node of the RAN. The control message comprises an indication for downlink data forwarding at RLC level to the third node.

Block 510 comprises forwarding, in response to the received indication, downlink data received from the first node at RLC level to the third node. In case of 3GPP CU-DU, the downlink data may be forwarded over the F-new interface illustrated in FIG. 3.

Figure 6:
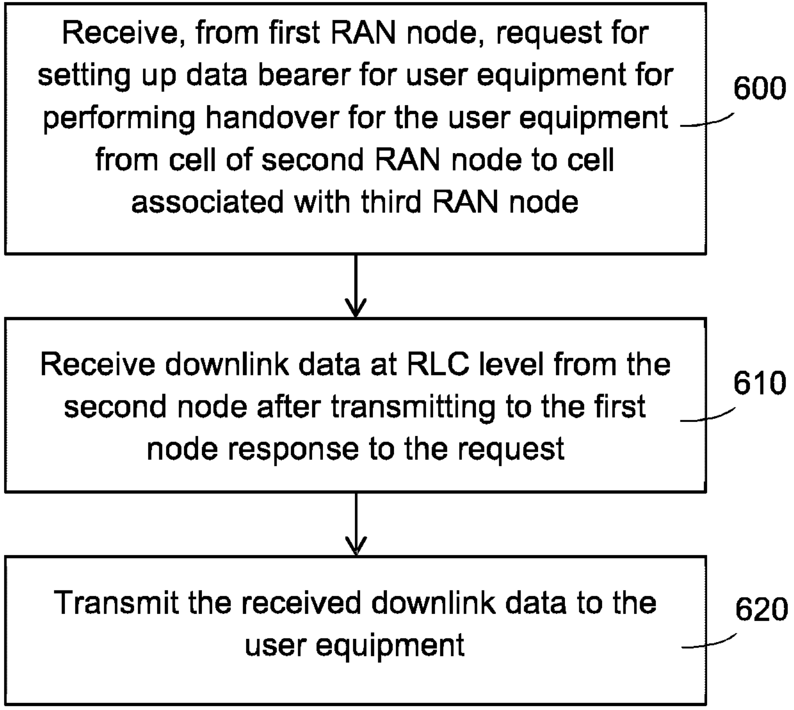

FIG. 6 is a flow graph of a method for controlling RLC data transmission for handover of a UE accordance with at least some embodiments. The method may be performed by a (third) RAN node, such as the DU 26 (which is also referred to some further example embodiments) operative as a target node for the handover, or by a control device configured to control the functioning thereof.

Block 600 comprises receiving, from a first node of the RAN, a request for setting up a data bearer for a user equipment for performing a handover for the user equipment from a cell of a second node of the RAN to a cell associated with the third node performing the method. The apparatus may start to prepare for handover of the UE, e.g. setup a UE context, and transmit a response to the request to the first node. The request may be transmitted by the first node in response to and after block 400, in some embodiments before entering block 410 (which the first node may enter upon receiving the response to the request).

Block 610 comprises receiving downlink data at RLC level from the second node after transmitting a response to the request to the first node. In case of 3GPP CU-DU, the downlink data may be received over the F-new interface illustrated in FIG. 3.

Block 620 comprises transmitting the received downlink data to the user equipment. The DL data may be buffered in block 610 and transmitted upon completing access of the UE to the cell of the third node, e.g. after completing RRC reconfiguration.

The downlink data may comprise non-transmitted DL packet(s) and/or unacknowledged DL data packet(s). Thus, the second (source) node may forward any non-transmitted available data to the third (target) node. In case an acknowledged mode of operation, such as the 5G NR AM mode, is applied, the second node may forward any already transmitted but not acknowledged DL packet(s) to the third node. The term handover may generally refer to serving cell change. The DL data forwarding at RLC level may refer to data forwarding action at RLC protocol layer, and may be performed by RLC protocol entity of the respective RAN node. The control message may be referred to as a handover preparation control message. In an example embodiment, the control message is a request for modifying UE context.

The first node may continue forwarding the downlink data to the second node after block 410, and also after receiving a response from the second node to the control message. The first node may request the third node to set up a data bearer for the UE and continue forwarding DL data to the second node also after setting up the data bearer. The first node may continue forwarding the downlink data to the second node until receiving from the third node an RRC message indicative of completing the handover. The first node may thus start or switch to transmit downlink data for the user equipment to the third node in response to receiving the RRC message indicative of completing the handover. For example, the RRC message is a RRC reconfiguration complete message.

Between block 510 and 520, there may be a further block of defining which packets have not been transmitted and/or which already transmitted RLC packets have not been acknowledged. Based on this defining, the second node may forward such to the third node, i.e. to the target cell. The second node may define data delivery status information based on this defining, and transmit the data delivery status information to the third node. In addition to providing the unacknowledged packets, they may be specifically marked e.g. in the data delivery status as being unacknowledged.

The third node may control downlink data transmission to the UE on the basis of the received data delivery status informing which packets have not been transmitted and/or which already transmitted RLC packets have not been acknowledged. The third node may control DL data transmission operations on the basis of the received data delivery status information. The third node may thus forward such non-transmitted and/or unacknowledged RLC packets, from the second node to the UE on the basis of the received data delivery status information. Upon receiving the data delivery status, the third node may process the data delivery status to define from which RLC packet to start the transmission to the UE. The third node/target cell may thus start the transmission to the UE based on last successfully acknowledged RLC PDU by the second node, i.e. send RLC PDU following the last successfully acknowledged RLC PDU.

The control message may comprise an indication for the second node to stop data transmission to the UE. Thus, the second node stops sending DL data to the UE, but forwards any packets pending transmission to the third node. The second node may upon processing the control message 500 detect the need for RLC level DL data forwarding and obtain an identifier or address of the third node in the control message for the data forwarding in block 510. In some other embodiments, the second node/source DU may, in addition to transmitting or forwarding 320 the data to the third node/target DU, transmit the downlink data transmission also to the user equipment.

In some embodiments, at least some of the presently disclosed features are applied for 5G NR systems, some further such example embodiments being illustrated below with references to NR RAN CU and DU entities, without limiting application of the features to such RANs.

In case of a handover (legacy or conditional handover), the target DU/cell may now start DL transmissions to the UE based on last successfully transmitted RLC PDU at source gNB DU, instead of based on PDCP level operations by the gNB CU. The present features facilitate to reduce signalling and delay for inter-RAN node or inter-DU handover. Fewer interactions are required through the F1-C interface, which leads to less delay and less signaling cost. PDCP layer is not involved in packets' retransmission procedure, which leads to less delay, e.g., some ms, that is important for time critical applications. The present data forwarding at the RLC level enables to improve efficiency and to avoid RLC packets being re-transmitted after already being acknowledged. The target DU may transmit only the lost RLC PDUs to the UE, as well as the subsequent RLC PDUs that have been processed by PDCP at the source gNB but not yet sent to the UE.

There may be a further step before block 410 on determining or selecting whether or not to apply the RLC level data forwarding, e.g. after block 400. Block 410 is entered if based on current operating parameters the RLC level forwarding is selected, e.g. in case of a delay-critical session or bearer being active for the UE. Otherwise, DL transmission control during the handover may be performed without inter-DU RLC level forwarding, by forwarding relevant DL packets (and data delivery status) to the target DU by the CU and at the PDCP level.

The DL data transmission at the RLC level from the second node to the third node may be service and/or network slice dependent. RLC level data forwarding may be controlled on or off separately for each data bearer, and RLC data forwarding may thus be specific to a data bearer associated with the service and/or network slice. This may depend on service quality of service (QoS) requirements and/or slice service level agreements (SLAs). Latency is one example of key performance indicator on the basis of which RLC forwarding may be selected.

Differential handling, RLC level forwarding by the source DU or PDCP level forwarding by the CU, may thus be applied for DL data handling, depending on slice or service. The differential handling may be dependent on whether or not a given data radio bearer (DRB) is served by the same CU-UP or a different one. For example, if a UE has a latency-critical slice association, all the PDU sessions of the UE are forwarded on the RLC level.

The control message 410, 500 may comprise a list of data radio bearer identifiers and indicate RLC level downlink data forwarding to the third node/target DU for said data radio bearers. The source DU may then selectively arrange data forwarding 510 for the radio bearers in the list.

For example, in case of multi-slice UEs, a hybrid packet forwarding can be applied. That is, packets pertaining to a slice can be forwarded over the F-new interface between the DUs, while packets pertaining to another slice, such as delay tolerant packets or packets with strict security requirements, may be forwarded via CU-UP processing. Further flexibility is enabled, since depending on the service and/or slice, the forwarding over F-new interface may be allowed or not, i.e., the use of the F-new can be slice/service-dependent.

Figure 7:
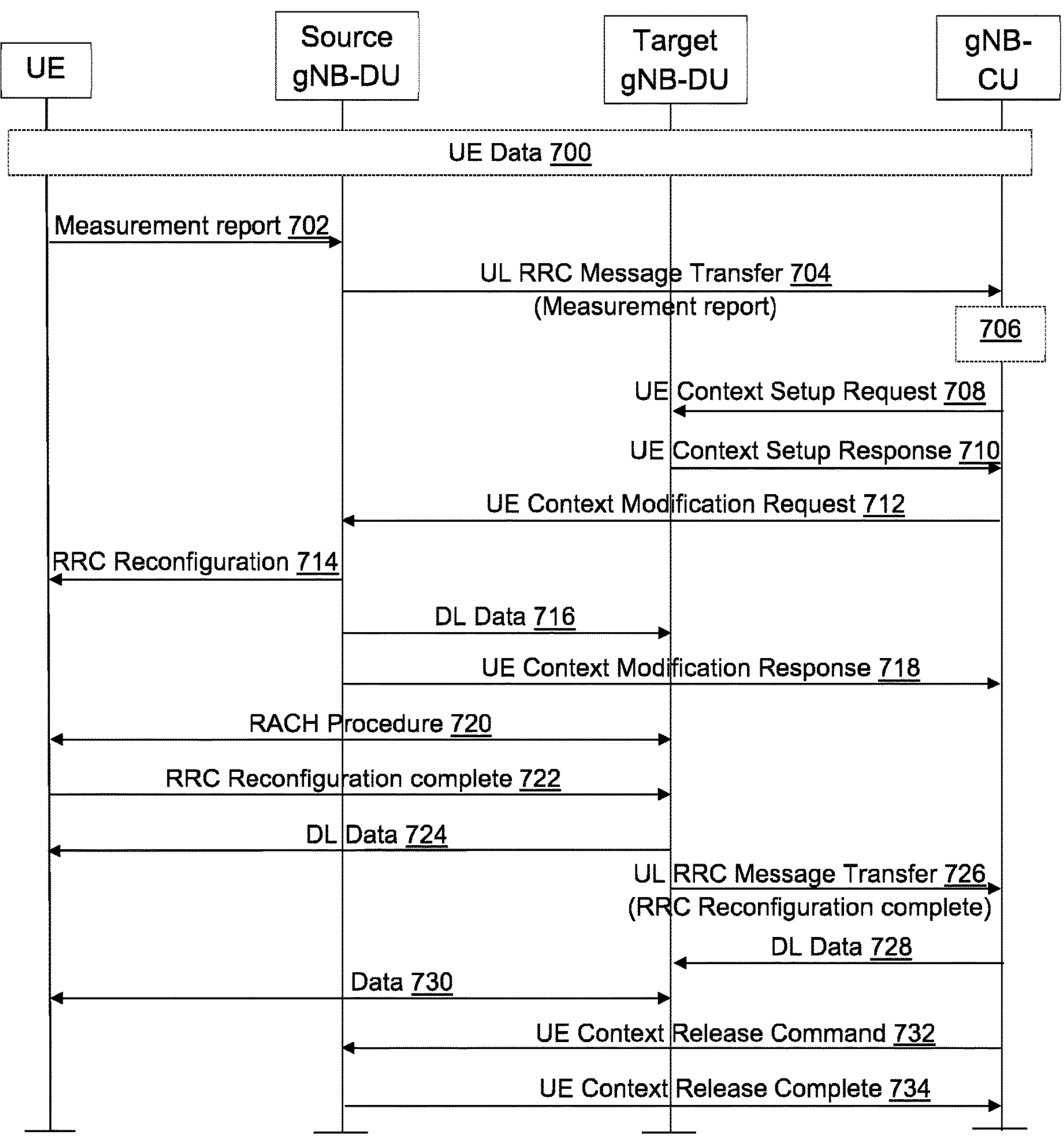
FIG. 7 is a signalling example illustrating handover and RLC level data forwarding in accordance with some example embodiments.

FIG. 7 illustrates a signaling example for a 3GPP 5G NR system. UE data is first transmitted 700 via the source gNB-DU and gNB-CU.

To report radio signal measurement information, the UE sends a MeasurementReport message 702 to the source gNB-DU. The source gNB-DU sends an UL RRC MESSAGE TRANSFER message 704 to the gNB-CU to convey the received MeasurementReport message.

Upon detecting 706 a need for handover based on the information in the MeasurementReport message, the gNB-CU sends a UE CONTEXT SETUP REQUEST message 708 to the target gNB-DU to create an UE context and setup one or more data bearers.

The request for setting up a data bearer for the UE, such as the message 708, may comprise an indication of the RLC level DL data forwarding by source DU. The gNB-CU may include a flag and the corresponding DRB IDs in message 708 to indicate that the source gNB-DU has been configured for RLC level data forwarding for one or more data bearers. This enables the target gNB-DU to be aware and prepared for RLC level data forwarding.

The target gNB-DU responds to the gNB-CU with an UE CONTEXT SETUP RESPONSE message 710. This response message may comprise a confirmation for the RLC level data forwarding of one or more data bearers.

The gNB-CU sends a UE CONTEXT MODIFICATION REQUEST message 712 to the source gNB-DU, which includes a generated RRCReconfiguration message. The message 712 may indicate to stop the data transmission for the UE, in response to which the source gNB-DU may stop transmitting data directly to the UE.

The CU indicates in message 712 to the DU to use RLC level DL data forwarding. The indication may be a new information element, e.g. a new flag, in the UE CONTEXT MODIFICATION REQUEST. The source gNB-DU may upon processing the message 712 detect the need for RLC level DL data forwarding in response to the associated indication and obtain an identifier of the target gNB-DU in the message 712 for the data forwarding. In some embodiments, as indicated, this configuration can be per DRB, i.e., service/slice dependent. Thus, the indication is associated with at least one DRB identifier, which may be included in the new information element.

The source gNB-DU forwards the received RRCReconfiguration message 714 to the UE. The source gNB-DU forwards 716 to the Target gNB-DU indicated in the message 712 any pending non-transmitted available DL data and unacknowledged data (in case of RLC AM mode at the source DU). The latter may be marked as unacknowledged in the Downlink Data Delivery Status (DDDS), which the source gNB-DU may transmit together with the DL data. The DDDS may be a dedicated PDU transmitted on the F1-U interface.

The forwarded 510, 610, 716 DL packets may be RLC PDUs. The source gNB-DU may need to send RLC PDUs which have not been acknowledged and also PDCP SDUs which have not been processed by RLC (already received from PDCP and present in RLC buffers).

The source gNB-DU responds to the gNB-CU with UE CONTEXT MODIFICATION RESPONSE message 718. A Random Access procedure 720 is performed at the target gNB-DU. The UE responds to the target gNB-DU with an RRCReconfigurationComplete message 722.

The target gNB-DU transmits to the UE any pending DL data 724 received from the source gNB-DU in 716 (or after), such as the unacknowledged RLC downlink data.

The target gNB-DU sends an UL RRC MESSAGE TRANSFER message 726 to the gNB-CU to convey the received RRCReconfigurationComplete message. The gNB-CU may stop forwarding (PDCP layer) data to the Source gNB-DU in response to the reception of this message.

DL packets 728 are sent to the target gNB-DU from gNB-CU. Packets 730 are sent from the target gNB-DU to the UE and vice versa.

The gNB-CU sends UE CONTEXT RELEASE COMMAND message 732 to the source gNB-DU. The source gNB-DU releases the ULE context and responds the gNB-CU with UE CONTEXT RELEASE COMPLETE message 734.

It is to be noted that there may be some differences to the example of FIG. 7. For example, DL data forwarding 716 could be after message 718 and/or pending DL data 724 could be transmitted after RRC Reconfiguration complete message 726.

Features illustrated above for arranging the RLC level DL data forwarding may be applied for conditional handover. In case of CHO, the gNB-CU may transmit the RLC level DL data forwarding indication in F1 UE Context Modification Request to the source gNB-DU, similarly as above in message 712. This UE Context Modification Request message may be sent after UL RRC MESSAGE TRANSFER message to the gNB-CU (after RACH for a candidate gNB-DU that becomes the target gNB-DU among initial set of candidate gNB-DUs, and the message conveying RRCReconfigurationComplete message received from the UE). The UE Context Modification Request may hence indicate to forward to the DU that became the target gNB-DU and from which UL RRC MESSAGE TRANSFER message was received. The source gNB-DU may then, in response to the indication, forward any non-transmitted or unacknowledged data for the UE, as well as transmit the data delivery status, to the indicated target gNB-DU. Based on such data received from the source gNB-DU, the target gNB-DU transmits pending DL data packets to the UE.

In an embodiment, the target cell, i.e. the third node/target gNB-DU, may configure the UE to report RLC status during or after the handover execution. This may be performed for some DRBs for which direct RLC forwarding between the DUs is enabled. The target cell/gNB-DU may then control RLC level DL transfer based on the received RLC status report, e.g. transmit an RLC PDU (which may be received from the source cell) not received by the UE.

The new interface between the DUs for the DL RLC level data forwarding, in the example of FIG. 3 the F-new, may have its transport via the CU-UP. This may be provided by transparent forwarding. That is, the interface may be a logical interface, where the CU-UP is merely relaying the packets between the DUs without processing the content. With CU transparent forwarding embodiment, at least some of the presently related features can thus be applied utilizing the 3GPP F1 interface.

The above methods and embodiments thereof may be applied for centralized and distributed deployments. In a centralized deployment (which may also be referred to as classical gNB), there is a single DU in a gNB and hence the RLC level data forwarding occurs over Xn. In a distributed deployment, or cloud gNB, there are multiple DUs connected to a CU, and the RLC level data forwarding between DUs may be arranged via the new F-new interface.

An electronic device comprising electronic circuitries may be an apparatus for realizing at least some embodiments of the present invention. The apparatus may be or may be comprised in a computer, a base station, access point device, a RAN element or node, a RAN controller, or another apparatus capable for at least controlling radio link control level data transmission. In another embodiment, the apparatus carrying out at least some of the above-described functionalities is comprised in such a device, e.g. the apparatus may comprise a circuitry, such as a chip, a chipset, a microcontroller, or a combination of such circuitries in any one of the above-described devices.

Figure 8:
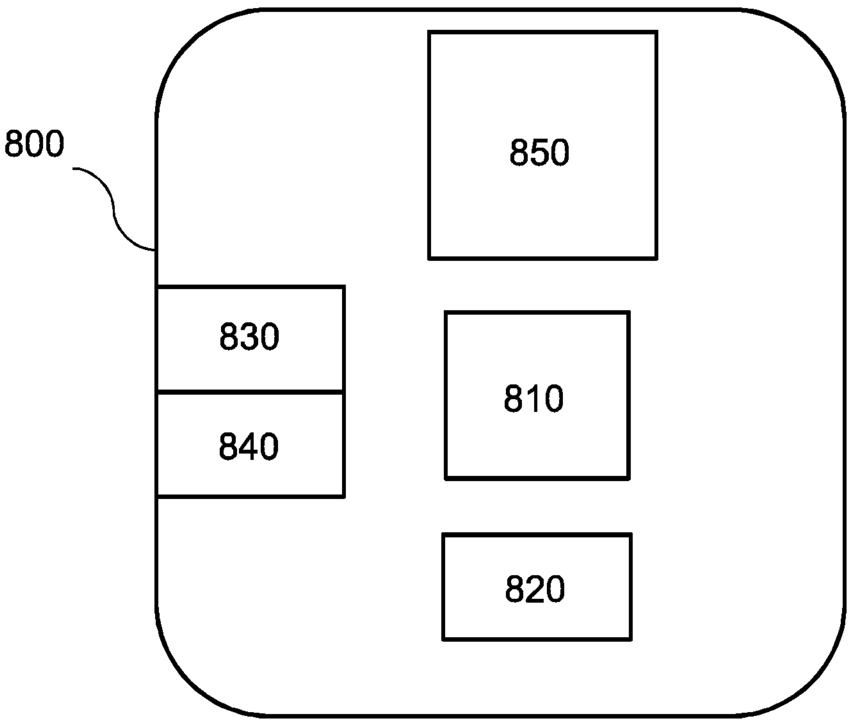
FIG. 8 illustrates an example apparatus capable of supporting at least some embodiments.

FIG. 8 illustrates an example apparatus capable of supporting at least some embodiments. Illustrated is device 800, which may comprise, for example, in applicable parts, a physical node running a CU 22, DU 24, or DU 26, for example. The device may be configured to operate as the apparatus performing the method of FIG. 4, 5, 6, or an embodiment thereof.

Comprised in device 800 is processor 810, which may comprise, for example, a single- or multi-core processor wherein a single-core processor comprises one processing core and a multi-core processor comprises more than one processing core. Processor 810 may comprise, in general, a control device. Processor 810 may comprise more than one processor. Processor 810 may be a control device. Processor 810 may comprise at least one application-specific integrated circuit, ASIC. Processor 810 may comprise at least one field-programmable gate array, FPGA. Processor 810 may be means for performing method steps in device 800, such as receiving, transmitting and/or providing, for example. Processor 810 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 800 may comprise memory 820. Memory 820 may comprise random-access memory and/or permanent memory. Memory 820 may comprise at least one RAM chip. Memory 820 may comprise solid-state, magnetic, optical and/or holographic memory, for example. Memory 820 may be at least in part accessible to processor 810. Memory 820 may be at least in part comprised in processor 810. Memory 820 may be means for storing information. Memory 820 may comprise computer instructions that processor 810 is configured to execute. When computer instructions configured to cause processor 810 to perform certain actions are stored in memory 820, and device 800 overall is configured to run under the direction of processor 810 using computer instructions from memory 820, processor 810 and/or its at least one processing core may be considered to be configured to perform said certain actions. Memory 820 may be at least in part comprised in processor 810. Memory 820 may be at least in part external to device 800 but accessible to device 800.

Device 800 may comprise a transmitter 830. Device 800 may comprise a receiver 840. Transmitter 830 and receiver 840 may be configured to transmit and receive, respectively, information in accordance with at least one cellular or non-cellular standard. Transmitter 830 may comprise more than one transmitter. Receiver 840 may comprise more than one receiver. Transmitter 830 and/or receiver 840 may be configured to operate in accordance with a suitable messaging protocol.

Device 800 may comprise user interface, UI, 850. UI 850 may comprise at least one of a display, a keyboard and a touchscreen. A user may be able to operate device 800 via UI 850, for example to configure operating parameters, such as parameter affecting an operation of the above described methods.

Processor 810 may be furnished with a transmitter arranged to output information from processor 810, via electrical leads internal to device 800, to other devices comprised in device 800. Such a transmitter may comprise a serial bus transmitter arranged to, for example, output information via at least one electrical lead to memory 820 for storage therein. Alternatively, to a serial bus, the transmitter may comprise a parallel bus transmitter. Likewise, processor 810 may comprise a receiver arranged to receive information in processor 810, via electrical leads internal to device 800, from other devices comprised in device 800. Such a receiver may comprise a serial bus receiver arranged to, for example, receive information via at least one electrical lead from receiver 840 for processing in processor 810. Alternatively, to a serial bus, the receiver may comprise a parallel bus receiver. Device 800 may comprise further devices not illustrated in FIG. 8. In some embodiments, device 800 lacks at least one device described above.

Processor 810, memory 820, transmitter 830, receiver 840 and/or UI 850 may be interconnected by electrical leads internal to device 800 in a multitude of different ways. For example, each of the aforementioned devices may be separately connected to a master bus internal to device 800, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus, comprising one or more processors and memory comprising instructions, when executed by the one or more processors, cause the apparatus to perform:

detecting a need to perform a handover for a user equipment from a cell of a second node of a radio access network, the second node being operative as a source distributed unit, to a cell of a third node of the radio access network, the third node being operative as a target distributed unit; and transmitting, to the second node and in response to detecting the need to perform the handover, a control message comprising an indication for downlink data forwarding at a radio link control level to the third node, wherein the apparatus is configured to perform transmitting, to the third node, a request for setting up a data bearer for the user equipment for performing the handover, wherein the request comprises an indication of the downlink data forwarding by the second node, wherein the downlink data forwarding at the radio link control level from the second node to the third node is service and/or network slice dependent and the control message comprises a list of radio bearer identifiers for which the downlink data is to be forwarded, and wherein the downlink data forwarding at the radio link control level is performed directly from the second node to the third node.

2. The apparatus of claim 1, wherein the request for setting up the data bearer comprises a flag and one or more corresponding data radio bearer identifiers indicating that the second node has been configured for radio link control level data forwarding for one or more data radio bearers.

3. The apparatus of claim 1, wherein the control message comprising the indication of the downlink data forwarding at the radio link control level is a user equipment context modification request comprising a radio resource control reconfiguration message, wherein the radio resource control reconfiguration message is transmitted to the user equipment for causing the user equipment to access the third node.

4. The apparatus of claim 1, wherein the downlink data comprises one or more non-transmitted radio link control level packet data units and/or one or more unacknowledged more radio link control level packet data units.

5. The apparatus of claim 1, wherein the apparatus is configured to perform continuing forwarding of the downlink data to the second node until receiving from the third node a radio resource control message indicative of completing the handover, and switching to transmit downlink data for the user equipment to the third node in response to receiving the radio resource control message indicative of completing the handover.

6. The apparatus of claim 1, wherein, prior to transmitting the control message, the apparatus is configured to perform determining whether to apply the downlink data forwarding at the radio link control level based on current operating parameters, wherein the downlink data forwarding at the radio link control level is selected in case of a delay-critical session or bearer being active for the user equipment, and wherein a hybrid packet forwarding is applied such that packets pertaining to a slice are forwarded at the radio link control level from the second node to the third node and packets pertaining to another slice are forwarded via centralized unit user plane processing.

7. The apparatus of claim 6, wherein the control message to the second node indicates which data radio bearers are to use radio link control level data forwarding to the third node, and wherein the request for setting up the data bearer transmitted to the third node indicates radio link control level data forwarding by the second node for said data radio bearers.

8. An apparatus, comprising one or more processors and memory comprising instructions, when executed by the one or more processors, cause the apparatus to perform:

receiving, from a first node of a radio access network, a control message in response to a need to perform a handover for a user equipment from a cell associated with the apparatus to a cell of a third node of the radio access network, the first node comprising a central or controller unit, wherein the control message comprises an indication for downlink data forwarding at a radio link control level to the third node, the third node being operative as a target distributed unit; and forwarding, in response to the received indication, downlink data received from the first node at the radio link control level to the third node, wherein the apparatus is configured to perform transmitting data delivery status to the third node to inform the third node which radio link control level packets have not been transmitted and/or which radio link control level packets have not been acknowledged, wherein the apparatus is configured to perform forwarding one or more unacknowledged data packets to the third node when in an acknowledged mode of operation, and configured to perform indicating to the third node that the one or more data packets are unacknowledged.

9. The apparatus of claim 8, wherein the data delivery status is a dedicated protocol data unit transmitted on a user plane interface between the apparatus and the third node, wherein unacknowledged data packets forwarded to the third node are marked as unacknowledged in the data delivery status, and wherein the forwarded downlink data comprises radio link control packet data units which have not been acknowledged and packet data convergence protocol service data units which have not been processed by radio link control and are present in radio link control buffers.

10. The apparatus of claim 8, wherein the apparatus is configured to perform, in addition to forwarding the downlink data to the third node, transmitting the downlink data to the user equipment.

11. The apparatus of claim 8, wherein the apparatus is or comprises a second node of the radio access network operative as a source distributed unit, the first node is a central or controller unit configured to control the handover for the user equipment, and the third node is a target distributed unit.

12. The apparatus of claim 8, wherein the control message comprising the indication of the downlink data forwarding at the radio link control level is a user equipment context modification request comprising a radio resource control reconfiguration message, wherein the radio resource control reconfiguration message is transmitted to the user equipment for causing the user equipment to access the third node.

13. The apparatus of claim 8, wherein the forwarded downlink data comprises packet data convergence protocol service data units present in a radio link control buffer of the second node.

14. The apparatus of claim 8, wherein the downlink data forwarding at the radio link control level from the second node to the third node is service and/or network slice dependent and the control message comprises a list of radio bearer identifiers for which the downlink data is to be forwarded.

15. An apparatus, comprising one or more processors and memory comprising instructions, when executed by the one or more processors, cause the apparatus to perform:

receiving, from a first node of a radio access network, a request for setting up a data bearer for a user equipment for performing a handover for the user equipment from a cell of a second node to a cell associated with the apparatus, receiving downlink data at a radio link control level from the second node after transmitting to the first node a response to the request, and transmitting the received downlink data to the user equipment, wherein the apparatus is configured to perform:

receiving data delivery status from the second node, wherein the data delivery status is indicative of which radio link control level packets have not been transmitted and/or which radio link control level packets have not been acknowledged by the second node, determining, on the basis of the received data delivery status, which non-transmitted and/or unacknowledged radio link control level packets need to be transmitted to the user equipment, and transmitting said non-transmitted and/or unacknowledged radio link control level packets to the user equipment.

16. The apparatus of claim 15, wherein the apparatus is configured to perform:

processing the data delivery status from the second node to define from which radio link control packet to start transmission to the user equipment, wherein the apparatus starts the transmission to the user equipment based on a last successfully acknowledged radio link control packet data unit by the second node, and configuring the user equipment to report radio link control status during or after the handover execution for one or more data radio bearers for which direct radio link control level forwarding between the second node and the apparatus is enabled, and controlling radio link control level downlink transfer to the user equipment based on a received radio link control status report from the user equipment.

17. The apparatus of claim 15, wherein the apparatus determines which radio link control packet to transmit to the user equipment starting from a packet following a last successfully acknowledged radio link control packet indicated in the data delivery status.

18. The apparatus of claim 15, wherein the downlink data forwarding at the radio link control level from the second node to the third node is service and/or network slice dependent and the control message comprises a list of radio bearer identifiers for which the downlink data is to be forwarded.

19. The apparatus of claim 15, wherein the apparatus is configured to perform configuring the user equipment to report radio link control status during or after the handover execution for one or more data radio bearers for which direct radio link control level forwarding between the second node and the apparatus is enabled, and controlling radio link control level downlink transfer to the user equipment based on a received radio link control status report from the user equipment.

20. The apparatus of claim 15, wherein the apparatus is configured to perform processing the data delivery status from the second node to define from which radio link control packet to start transmission to the user equipment, wherein the apparatus starts the transmission to the user equipment based on a last successfully acknowledged radio link control packet data unit by the second node.

* * * * *